United States Patent
Meyerhofer et al.

(10) Patent No.: US 10,186,114 B2
(45) Date of Patent: *Jan. 22, 2019

(54) BONUS JACKPOTS IN ENRICHED GAME PLAY ENVIRONMENT

(71) Applicant: Gamblit Gaming, LLC, Glendale, CA (US)

(72) Inventors: Eric Meyerhofer, Pasadena, CA (US); Caitlyn Ross, Watertown, MA (US)

(73) Assignee: Gamblit Gaming, LLC, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/681,966

(22) Filed: Aug. 21, 2017

(65) Prior Publication Data

US 2017/0345259 A1 Nov. 30, 2017

Related U.S. Application Data

(63) Continuation of application No. 14/467,646, filed on Aug. 25, 2014, now Pat. No. 9,741,208, which is a
(Continued)

(51) Int. Cl.
*A63F 13/00* (2014.01)
*G07F 17/32* (2006.01)
(Continued)

(52) U.S. Cl.
CPC .......... *G07F 17/3258* (2013.01); *A63F 13/00* (2013.01); *A63F 13/352* (2014.09);
(Continued)

(58) Field of Classification Search
None
See application file for complete search history.

(56) References Cited

U.S. PATENT DOCUMENTS 6,050,895 A * 4/2000 Luciano, Jr. ............ G07F 17/32
463/20
7,294,058 B1 * 11/2007 Slomiany ................ G07F 17/32
463/31
(Continued)

FOREIGN PATENT DOCUMENTS

| JP | 2006110258 | 4/2006 |
|---|---|---|
| WO | 2011109454 A1 | 9/2011 |
| WO | 2012078668 A1 | 6/2012 |

OTHER PUBLICATIONS

U.S. Appl. No. 14/205,303 Arnone, et al., filed Mar. 11, 2014.
(Continued)

*Primary Examiner* — Jason Yen
(74) *Attorney, Agent, or Firm* — Caitlyn Ross

(57) ABSTRACT

An electronic gaming machine for a providing a jackpot bonus in a gaming system A jackpot bonus element is generated in an entertainment game portion of a hybrid game and a gambling game in a gambling game portion of the hybrid game is triggered when a player initiates an encounter in the entertainment game with the bonus element. It is then determined if the player wins the gambling game triggered by the player's encounter with the bonus element in the entertainment game a payout is provided to the player when it is determined that the player has won the gambling game.

11 Claims, 8 Drawing Sheets

Related U.S. Application Data continuation of application No. 14/162,724, filed on Jan. 23, 2014, now Pat. No. 8,845,419, which is a continuation of application No. 13/962,839, filed on Aug. 8, 2013, now Pat. No. 8,657,675, which is a continuation of application No. PCT/US2012/067476, filed on Nov. 30, 2012.

(60) Provisional application No. 61/629,874, filed on Nov. 30, 2011.

(51) Int. Cl.
  *A63F 13/352* (2014.01)
  *A63F 13/792* (2014.01)

(52) U.S. Cl.
  CPC ........ *A63F 13/792* (2014.09); *G07F 17/3225* (2013.01); *G07F 17/3267* (2013.01); *G07F 17/3295* (2013.01)

(56) References Cited

U.S. PATENT DOCUMENTS

| | | | |
|---|---|---|---|
| 8,622,809 B1 | 1/2014 | Arora et al. | |
| 9,070,257 B1 | 6/2015 | Scalise | |
| 2004/0097610 A1 | 5/2004 | Saito | |
| 2005/0239538 A1* | 10/2005 | Dixon | G07F 17/3267 463/20 |
| 2006/0189371 A1 | 8/2006 | Walker | |
| 2010/0120525 A1 | 5/2010 | Baerlocher | |
| 2010/0137047 A1* | 6/2010 | Englman | G07F 17/32 463/6 |
| 2010/0240436 A1* | 9/2010 | Wilson | G07F 17/3244 463/20 |
| 2011/0111837 A1* | 5/2011 | Gagner | G07F 17/3211 463/25 |
| 2011/0212766 A1* | 9/2011 | Bowers | G07F 17/32 463/25 |
| 2012/0115580 A1* | 5/2012 | Hornik | G07F 17/3258 463/25 |
| 2013/0260869 A1 | 10/2013 | Leandro et al. | |
| 2014/0087801 A1 | 3/2014 | Nicely et al. | |
| 2014/0087808 A1 | 3/2014 | Leandro et al. | |
| 2014/0087809 A1 | 3/2014 | Leupp et al. | |

OTHER PUBLICATIONS

U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 24, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.
International Search Report and Written Opinion, PCT/US2012/67476, dated Mar. 15, 2013.
Japan Patent Office, Office Action, Japan Application No. 2014-544963, dated Oct. 16, 2015.
Intellectual Property Office of the Philippines, Subsequent Substantive Examination Report, Application No. 12014501205, dated Mar. 7, 2016.
Intellectual Property Office of Singapore Written Opinion, IPOS Application No. 11201402644R, dated Jan. 30, 2015.

* cited by examiner

BONUS JACKPOTS IN ENRICHED GAME PLAY ENVIRONMENT

CROSS-REFERENCE TO RELATED APPLICATION

This application is a continuation of U.S. patent application Ser. No. 14/467,646 filed on Aug. 25, 2014, which is a continuation of U.S. patent application Ser. No. 14/162,724 filed on Jan. 23, 2014, and issued as U.S. Pat. No. 8,845,419 on Sep. 30, 2014, which is a continuation of U.S. patent application Ser. No. 13/962,839, filed on Aug. 8, 2013, and issued as U.S. Pat. No. 8,657,675 on Feb. 25, 2014, which is a continuation of Patent Cooperation Treaty Application No. PCT/US12/67476, filed on Nov. 30, 2012 which claims the benefit of U.S. Provisional Patent Application No. 61/629,874 filed on Nov. 30, 2011 and is related to PCT patent application No. PCT/US11/26768, filed Mar. 1, 2011, PCT patent application No. PCT/US11/63587, filed on Dec. 6, 2011, and PCT patent application No. PCT/US12/58156, filed on Sep. 29, 2012, the contents of each of which are hereby incorporated by reference in its entirety as if stated in full herein.

FIELD

Embodiments of the present invention are generally related to gaming and more specifically to providing a bonus jackpot in a bonus jackpot hybrid game that includes both an entertainment game and a gambling game.

BACKGROUND

The gaming machine manufacturing industry has traditionally developed gaming machines with a gambling game. A gambling game is typically a game of chance, which is a game where the outcome of the game is generally dependent solely on chance (such as a slot machine). A game of chance can be contrasted with a game of skill where the outcome of the game may depend upon a player's skill with the game. Gambling games are typically not as interactive and do not include graphics as sophisticated as an entertainment game, which is a game of skill such as a video game.

SUMMARY

Systems and methods in accordance with embodiments of the invention operate bonus jackpots in enriched game play environment. One embodiment includes a gaming system including: at least one processor; and a memory coupled to the at least one processor, the memory storing instructions executable by the at least one processor, the instructions including: coupling by a game world engine to a gambling game, the gambling game having a randomly generated payout of real world credits for a player's wager in the gambling game; coupling by the game world engine via a network to an entertainment game having outcomes based upon the player's skillful execution of the entertainment game to earn a payout of game world credits; generating by the game world engine a jackpot bonus element in the entertainment game, where the jackpot bonus does not travel in the entertainment game from place to place, but remains in a set location for a period of time independently of the player within the space of the entertainment game; providing by the game world engine a payout of real world credit in the gambling game when a player initiates an encounter in the entertainment game with the jackpot bonus element; and providing by the game world engine a payout of game world credit in the entertainment game in the case the player achieves an objective in the entertainment game associated with the jackpot bonus element.

In some embodiments, the jackpot bonus element is a non-player character in the entertainment game portion of the hybrid game.

In several embodiments, the entertainment game portion of the hybrid game is played by multiple players and the multiple players compete to trigger the payout of real world credits in the gambling game by encountering the jackpot bonus element within the entertainment game.

In some embodiments, an operator requests a jackpot bonus element to be inserted into a bonus jackpot hybrid game.

In many embodiments, the jackpot bonus element appears periodically within the entertainment game.

In some embodiments, player has improved odds for winning the jackpot bonus once the jackpot bonus is available.

In several embodiments, finding the jackpot bonus is sufficient for claiming the jackpot bonus.

In many embodiments, defeating or otherwise claiming the jackpot bonus becomes linearly more difficult as its value increases.

In several embodiments, defeating or otherwise claiming the jackpot bonus becomes exponentially more difficult as its value increases.

In many embodiments, defeating or otherwise claiming the jackpot bonus becomes more difficult based on the level of the entertainment game player is playing.

A yet another embodiment again includes, a method of providing a jackpot bonus in a networked gaming system, including: performing by one or more processors the following: coupling by a game world engine to a gambling game, the gambling game having a randomly generated payout of real world credits for a player's wager in the gambling game; coupling by the game world engine via a network to an entertainment game having outcomes based upon the player's skillful execution of the entertainment game to earn a payout of game world credits; generating by the game world engine a jackpot bonus element in the entertainment game, where the jackpot bonus element does not travel in the entertainment game from place to place, but remains in a set location for a period of time independently of the player within the space of the entertainment game; providing by the game world engine a payout of real world credit in the gambling game when the player initiates an encounter in the entertainment game with the jackpot bonus element; and providing by the game world engine a payout of game world credit in the entertainment game in the case the player achieves an objective in the entertainment game associated with the jackpot bonus element.

In many embodiments, the jackpot bonus element is a non-player character in the entertainment game.

In several embodiments, the entertainment game portion of the hybrid game is played by multiple players and the multiple players compete to trigger the payout of real world credits in the gambling game by encountering the jackpot bonus element within the entertainment game.

In many embodiments, an operator requests a jackpot bonus element to be inserted into a bonus jackpot hybrid game.

In several embodiments, the jackpot bonus element appears periodically within the entertainment game.

In some embodiments, player has improved odds for winning the jackpot bonus once the jackpot bonus is available.

In several embodiments, finding the jackpot bonus is sufficient for claiming the jackpot bonus.

In many embodiments, defeating or otherwise claiming the jackpot bonus becomes linearly more difficult as its value increases.

In some embodiments, defeating or otherwise claiming the jackpot bonus becomes exponentially more difficult as its value increases.

In several embodiments, defeating or otherwise claiming the jackpot bonus becomes more difficult based on the level of the entertainment game player is playing.

A yet another embodiment include, a gaming system including: at least one processor; and a memory coupled to the at least one processor, the memory storing instructions executable by the at least one processor, the instructions including: coupling by a game world engine to a gambling game, the gambling game having a randomly generated payout of real world credits for a player's wager in the gambling game; coupling by the game world engine via a network to an entertainment game having outcomes based upon the player's skillful execution of the entertainment game to earn a payout of game world credits; generating by the game world engine a jackpot bonus element in the entertainment game, where the jackpot bonus does not travel in the entertainment game from place to place, but remains in a set location for a period of time independently of the player within the space of the entertainment game; providing by the game world engine a payout of real world credit in the gambling game when a player initiates an encounter in the entertainment game with the jackpot bonus element; and providing by the game world engine a payout of game world credit in the entertainment game in the case the player achieves an objective in the entertainment game associated with the jackpot bonus element.

In several embodiments, the jackpot bonus element is a non-player character in the entertainment game portion of the hybrid game.

In some embodiments, the entertainment game portion of the hybrid game is played by multiple players and the multiple players compete to trigger the payout of real world credits in the gambling game by encountering the jackpot bonus element within the entertainment game.

In many embodiments, an operator requests a jackpot bonus element to be inserted into a bonus jackpot hybrid game.

In some embodiments, the jackpot bonus element appears periodically within the entertainment game.

In several embodiments, player has improved odds for winning the jackpot bonus once the jackpot bonus is available.

In many embodiments, finding the jackpot bonus is sufficient for claiming the jackpot bonus.

In several embodiments, defeating or otherwise claiming the jackpot bonus becomes linearly more difficult as its value increases.

In many embodiments, defeating or otherwise claiming the jackpot bonus becomes exponentially more difficult as its value increases.

In several embodiments, defeating or otherwise claiming the jackpot bonus becomes more difficult based on the level of the entertainment game player is playing.

DETAILED DESCRIPTION

Turning now to the drawings, systems and methods for operation of a bonus jackpot hybrid game are illustrated. In several embodiments, a bonus jackpot hybrid game is a form of a hybrid game that integrates a bonus jackpot offered to one or more player within both a gambling game that includes a real world engine (RWE) which manages the gambling game, as well as an entertainment game that includes a game world engine (GWE) which manages the entertainment portion of a game, and an entertainment software engine (ESE) which executes the entertainment game for user entertainment. In certain embodiments, the bonus jackpot hybrid game also includes a user interface associated with either or both the gambling game and the entertainment game. In operation of a bonus jackpot hybrid game, a player acts upon various types of elements of the entertainment game in a game world environment. Upon acting on some of these elements, a wager is triggered in the gambling game. In playing the entertainment game, using the elements, a player can consume and accrue game world credits (GWC) within the entertainment game. These credits can be in the form of (but are not limited to) game world objects, experience points, or points generally. Wagers are made in the gambling game using real world credits (RC). The real world credits can be credits in an actual currency, or may be credits in a virtual currency which may or may not have real world value. Gambling outcomes from the gambling game may cause consumption, loss or accrual of RC. In addition, gambling outcomes in the gambling game may influence elements in the entertainment game such as (but not limited to) by restoring a consumed element, causing the loss of an element, restoration or placement of a fixed element. Example elements include enabling elements (EE) which are elements that enable a player's play of the entertainment game and whose consumption by the player while playing the entertainment game may trigger a wager in a gambling game. In addition, EE may also be replenished during play within the entertainment game based on an outcome of a triggered wager. Other types of elements include actionable elements (AE) which are elements that are acted upon to trigger a wager in the gambling game and may not be restorable during normal play of the entertainment game. Still other elements include collective enabling elements (CEE) which are elements that are shared between two or more players. Various hybrid games are discussed in Patent Cooperation Treaty Application No. PCT/US11/26768, filed Mar. 1, 2011, entitled "ENRICHED GAME PLAY ENVIRONMENT (SINGLE and/or MULTI- PLAYER) FOR CASINO APPLICATIONS" and Patent Cooperation Treaty Application No. PCT/US11/63587, filed Dec. 6, 2011, entitled "ENHANCED SLOT-MACHINE FOR CASINO APPLICATIONS" each disclosure of which is hereby incorporated by reference in its entirety.

Figure 1:
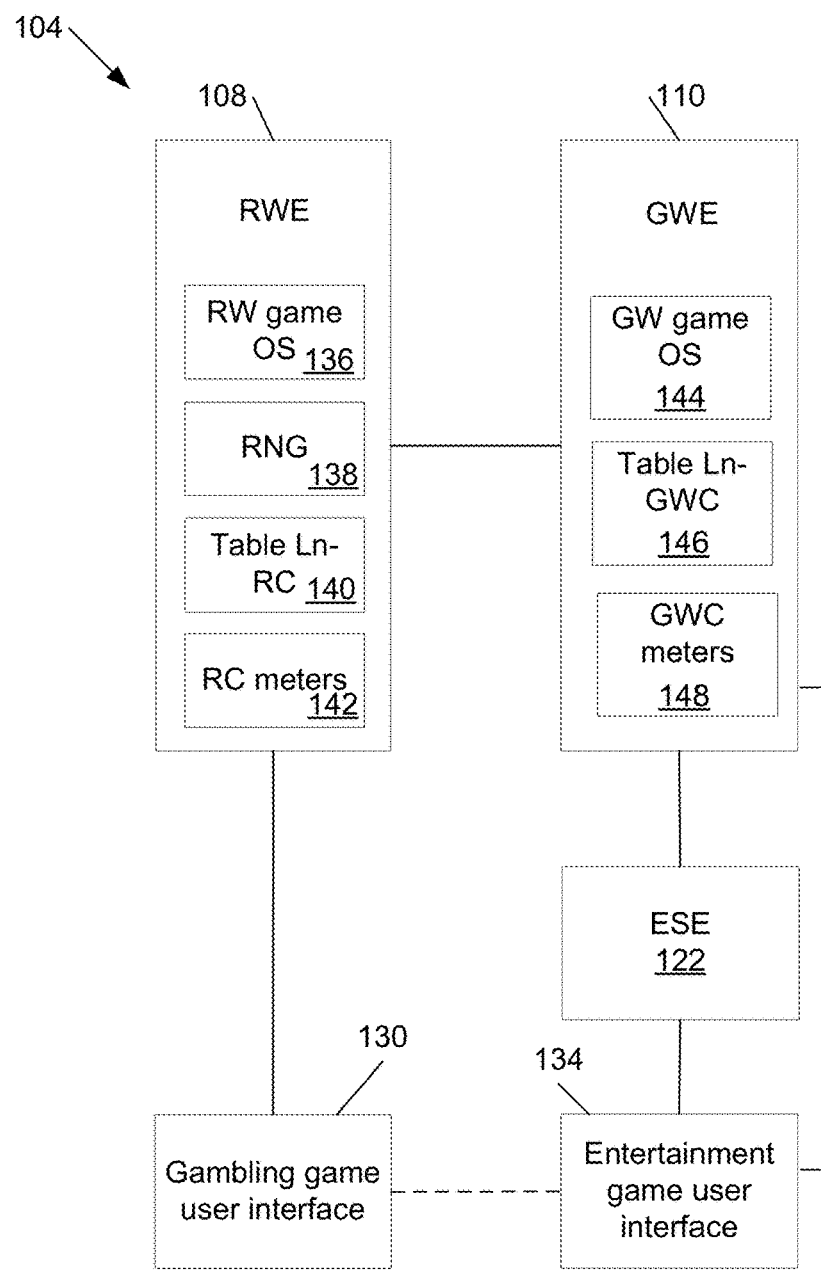
FIG. 1 is an illustration of a gaming environment in accordance with an embodiment.

FIG. 1 is an illustration of an embodiment of a bonus jackpot hybrid game system. A bonus jackpot hybrid game 104 is a game that integrates both a gambling game and an entertainment game. The bonus jackpot hybrid game includes a real world engine 108 (RWE) module or element that manages the gambling portion of the bonus jackpot hybrid game, a game world engine 110 (GWE) module or element that includes the bonus jackpot hybrid game control logic portion of the bonus jackpot hybrid game and manages an interface between the RWE and the entertainment portion of the bonus jackpot hybrid game, and an entertainment software engine 122 (ESE) module or element that executes the entertainment portion of the bonus jackpot hybrid game for user entertainment.

The GWE 108 manages ESE game world (GW) and RWE real world (RW) portions of the bonus jackpot hybrid game, and includes the mechanical, electronic and software components used to implement the bonus jackpot hybrid game control logic to perform various functions for the bonus jackpot hybrid game. For example, various implementations of a GWE include the functions of: (a) coupling to an ESE to signal and provide controls of the GW portion of the game operating in the ESE, (b) including tables for determining game world credits (GWCs) and, if applicable, take input from this table to affect the play of the GW portion of the game, (c) coupling to an RWE to determine and amount of real credit (RC) available on the bonus jackpot hybrid game and other metrics of wagering on the RW portion of the game, (d) potentially affect the amount of RC in play, pay tables, odds and other wager shaping factors in operation on the RWE, (e) providing various audit logs and activity meters, and (f) coupling to a centralized server for exchanging various data related to the player and their activities on the game.

The ESE 122 is a portion of a bonus jackpot hybrid game that is an electronic and software system including the control logic that controls the playing of video games for entertainment. The ESE accepts input from a player through a set of hand, foot, body, mind and/or visual controls and outputs video, audio and/or other sensory output to a user interface. A Personal Computer (PC), Sony PlayStation® or Microsoft Xbox® running a specific game program (e.g. a version of Madden Football '10 or Call of Duty®) would be typical examples of hosts for an ESE. For the purposes of this disclosure, the ESE interfaces and exchanges data with and accepts control information from various components in a bonus jackpot hybrid game, or a system of which the bonus jackpot hybrid game is a part.

In certain embodiments, the bonus jackpot hybrid game also includes a user interface associated with either or both the gambling game and the entertainment game. In many embodiments, an entertainment game is a skill, pseudo-skill or non-skill game, deterministic or interactive, operating on the ESE that provides an entertainment or informative sensory entertainment experience for the player.

In some embodiments, a bonus jackpot hybrid game is a form of a game, designed for use in a physical or virtual casino environment, that provides players an environment in that to play for cash, prizes and points, either against the casino or in head-to-head modes in a controlled and regulated manner while being allowed to use their skills and adeptness at a particular type of game. An example of such a game would be a challenging word spelling game, or an interactive action game such as is found on video game consoles popular today, such as a PlayStation®, an Xbox®, a Wii® or a PC based game. In various environments, an interactive entertainment game is provided where skill and chance may coalesce to provide a rich arcade-style gaming experience, visually exciting and challenging, where players may wager cash, credits prizes and points in order to win more of the foregoing.

RWE 108 functions as an operating system for the gambling game of the bonus jackpot hybrid game 104 and controls and operates the gambling game. The operation of a gambling game is enabled by real funds, accretes and declinates real gambling credits based on random gambling outcome, and whose gambling proposition is typically regulated by gaming control bodies. In many embodiments, the RWE 108 includes a real world (RW) operating system (OS) 136, random number generator (RNG) 138, level "n" real-world credit pay tables (table Ln-RC) 140, RC meters 142 and other software constructs that enable a game of chance to offer a fair and transparent gambling proposition, and to include the auditable systems and functions that can enable the game to obtain gaming regulatory body approval.

This is a table and/or algorithms that may exist, and may be used in conjunction with a random number generator to dictate the RC earned as a function of a wager proposition and is analogous to the pay tables used in a conventional slot machine. There may be one or a plurality of table Ln-Rc pay tables included in a game design.

In some embodiments, the RWE A portion of a bonus jackpot hybrid game which operates the RC wagering aspects, and includes the mechanical, electronic and software aspects to perform the following non-exhaustive list of functions: (a) include or interface to an RNG and provide control of the RW portion of the game, (b) include table Ln-RC and to take input from this table to affect the wagering activity of the game, (c) couple to the GWE to communicate the amount of RC available on the game, (d) communicate other metrics of wagering and its status to the GWE, (e) accept input from the GWE as to the amount of RC to be wagered, (f) accept signaling from the GWE in order to trigger execution of an wagering play, (g) include various audit logs and activity meters, (h) couple to a centralized server for exchanging various data related to accounting of the wagering proposition, the player and their wagering activities on the game. Certain aspects of an RWE would be analogous to components within a slot machine.

A real world can be considered a physical world of which humans are a part, as opposed to the virtual game world. For the purposes of this disclosure, this may also be used in the context of the gambling or wagering portion of the game hybrid game (the RWE) which may or may not include an entertainment portion of its own, but whose fundamental operation is enabled by real funds, and which accretes and declinates real wagering credits and/or funds based on random wagering outcomes, and whose wagering proposition is typically regulated by gaming control bodies. For the purposes of this disclosure, the fundamentals of the mechanisms of play of a slot machine should be thought of as RW.

A random number generator (RNG) 138 includes software and/or hardware algorithms and/or processes that are used to generate random or pseudorandom outcomes. A level n real-world credit pay table (table Ln-RC) 140 is a table that can be used in conjunction with a random number generator to dictate the real world credits (RC) earned as a function of game play and is analogous to the pay tables used in a conventional slot machine. Table Ln-Rc payouts are independent of player skill. There may be one or a plurality of table Ln-Rc pay tables contained in a gambling game, the selection of which may be determined by game progress a player has earned, and bonus rounds, which a player may be eligible for. Real world credits (RC) are credits analogous to slot machine game credits, which are entered into a gambling game by the user, either in the form of hard currency or electronic funds. RCs can be decremented or augmented based on the outcome of a random number generator according to the table Ln-Rc real world credits pay table, independent of player skill. In certain embodiments, an amount of RC can be required to enter higher ESE game levels. RC can be carried forward to higher game levels or paid out if a game cash out is opted for by a player. The amount of RC required to enter a specific level of the game "level n" need not be the same for each level.

In many embodiments, the GWE 110 manages the overall hybrid game operation, with the RWE 108 and the ESE 122 effectively being support units to the GWE 110. In several embodiments, the GWE 110 contains mechanical, electronic and software system for an entertainment game. The GWE includes a game world (GW) game operating system (OS) 144 that provides control of the entertainment game.

In some embodiments, the GWE also manages game world credits (GWCs) that are player and/or game GW points earned or depleted as a function of a player's skill or player performance in the context of an entertainment (i.e. ESE) game. GWC is analogous to the "score" in a typical video game. Any given entertainment game may have a scoring criterion native to its makeup, and methods for utilizing this score in the context of the bonus jackpot hybrid game may be embedded within a table Ln-GWC that reflects player performance against the goal(s) of the entertainment game. In some embodiments, GWC may be fungible between hybrid games, and may be carried forward from one level of game play to another in any given entertainment game. There may be one or more types of GWC present in a bonus jackpot hybrid game. GWC may be ultimately paid out in various manners such as directly in cash and goods prizes, or indirectly such as consumed or benchmarked for earning entrance into a sweepstakes drawing, or earning participation in a tournament with prizes, or indirectly by purchases and redemptions within the GW entertainment game context. In many embodiments, GWC may be utilized to determine ranking of players, and winners in tournaments. In some embodiments, GWC may be attributed to a specific player or player's avatar in the GW, may be stored on a system under a player account for accumulation over time and retrieval, and/or may be stored on a card or other transportable media.

The GWE additionally contains a level "n" game world credit pay table (table Ln-GWC) 146 indicating where to take input from this table to affect the play of the entertainment game. The GWE can further couple to the RWE 108 to determine the amount of RC available on the game and other metrics of wagering on the gambling game (and potentially affect the amount of RC in play on the RWE 108). The GWE additionally contains various audit logs and activity meters (such as the GWC meter 148). The GWE can also couple to a centralized server for exchanging various data related to the player and their activities on the game. The GWE furthermore couples to the ESE 122.

In many embodiments, a level "n" game world credit pay table (table Ln-GWC) 146 dictates the GWC earned as a function of player skill in the nth level of the game. The payouts governed by this table are dependent upon player skill and game play at large and may or may not be coupled to a random number generator. In several embodiments, game world credits (GWC) are player points earned or depleted as a function of player skill, i.e. as a function of player performance in the context of the game. GWC is analogous to the "score" in a typical video game. Each game has one or more scoring criterion, embedded within the table Ln-GWC 146 that reflects player performance against the goal(s) of the game. GWC can be carried forward from one level of game play to another, and ultimately paid out in various manners such as directly in cash, or indirectly such as earning entrance into a sweepstakes drawing, or earning participation in, or victory in, a tournament with prizes. GWC may be stored on a player tracking card or in a network-based player tracking system, where the GWC is attributed to a specific player.

In some embodiments, the operation of the GWE 110 does not affect the RWE's 108 gambling operation except for player choice parameters that are allowable in slot machines today, such as the wager amount, how fast the player wants to play (by pressing a button or pulling the slot's handle), agreement to wager into a bonus round, etc. In this sense, the RWE provides a fair and transparent, non-skill based gambling proposition co-processor to the GWE. In the illustrated embodiment, the communication link shown between the GWE 110 and the RWE 108 allows the GWE 110 to obtain information from the RWE 108 as to the amount of RC available in the gambling game. The communication link can also convey a necessary status operation of the RWE (such as on-line or tilt). The communication link can further communicate the various gambling control factors, which the RWE 108 uses as input, such as the number of RC consumed per game or the player's election to enter a jackpot round.

In FIG. 1, the GWE 110 is also shown as connecting to the player's user interface directly, as this may be necessary to communicate certain entertainment game club points, player status, control the selection of choices and messages which a player may find useful in order to adjust their entertainment game experience or understand their gambling status in the RWE 108.

In various embodiments, the ESE 122 manages and controls the visual, audio, and player control for the entertainment game. In certain embodiments, the ESE 122 accepts input from a player through a set of hand controls, and/or head, gesture, and/or eye tracking systems and outputs video, audio and/or other sensory output to a user interface. In many embodiments, the ESE 122 can exchange data with and accept control information from the GWE 110. In several embodiments an ESE 122 can be implemented using a personal computer (PC), a mobile device such as a smartphone, a tablet computer, a personal digital assistant, a Sony PlayStation® (a video game console developed by Sony Computer Entertainment of Tokyo Japan), or Microsoft Xbox® (a video game console developed by Microsoft Corporation of Redmond, Wash.) running a specific game program.

The ESE 122 operates mostly independently from the GWE 110, except that via their interface, the GWE 110 may send certain GW game control parameters to the ESE 122 to affect the entertainment game's play, such as (but not limited to) what level of character to be used, changing the difficulty level of the game, changing the type of game object, such as a gun or a car, in use, requesting portions to become available or to be found by the character, etc. The ESE 122 can accept this input from the GWE 110, make adjustments, and continue the play action all the while running seamlessly from the player's perspective. The ESE's 122 operation is mostly skill based, except for where the ESE's algorithm may inject complexities into the game by chance in its normal operation to create unpredictability in the entertainment game. Utilizing this interface, the ESE may also communicate player choices made in the game to the GWE 110, such as selection of a different gun, the player picking up a special portion in the GW environment, etc.

In other embodiments, operation of an entertainment game of a bonus jackpot hybrid game by a player consumes one or more enabling modules or elements (EEs) within the entertainment game. An EE is a module or element that is consumed by, traded or exchanged in, operated upon, or used to enable the entertainment game portion of the bonus jackpot hybrid game. There may be one or more types of EE present in the bonus jackpot hybrid game's entertainment game. Examples of EE include bullets in a shooting game, fuel in a racing game, letters in a word spelling game, downs in a football game, portions in a character adventure game, character health points, etc. The GWE can associate consumption of an EE with the commitment or wager of RC to a gambling game of the bonus jackpot hybrid game whereby commitment or wagering of the RC in the gambling game is coordinated with the consumption of the EE in the entertainment game because of actions of the player. Furthermore, the GWE can provide an increment or decrement of EE available to the player in coordination with the gambling outcome of the gambling game such as by incrementing the EE when RC is won or decrementing EE when RC is lost.

The GWE's job in this architecture, being interfaced thusly to the ESE, is to allow the transparent coupling of entertainment software to a fair and transparent random chance gambling game, providing a seamless perspective to the player that they are playing a typical popular entertainment game (which is skill based). In certain embodiments, the ESE 122 can be used to enable a wide range of games including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.), etc.). Providers of such software can provide the previously described interface by which the GWE 110 can request amendments to the operation of the ESE software in order to provide the seamless and sensible operation of the bonus jackpot hybrid game as both a gambling game and an entertainment game.

In several embodiments, the RWE 108 can accept a trigger to run a gambling game in response to actions taken by the player in the entertainment game as conveyed by the ESE 122 to the GWE 110, or as triggered by the GWE 110 based on the GWE's control logic, in the background to the overall game from the player's perspective, and can provide information to the GWE 110 to expose the player to certain aspects of the gambling game, such as (but not limited to) odds, amount of RC in play, and amount of RC available. The RWE 108 can accept modifications in the amount of RC wagered on each individual gambling try, or the number of games per minute the RWE 108 can execute, entrance into a bonus round, and other factors, all the while these factors can take a different form than that of a typical slot machine. An example of a varying wager amount that the player can choose might be that they have decided to play with a more powerful character in the game, or having a more powerful gun, a better car, etc. These choices can increase or decrease the amount wagered per individual gambling game, in the same manner that a standard slot machine player may decide to wager more or less credits for each pull of the handle. In several embodiments, the RWE 108 can communicate a number of factors back and forth to the GWE 110, via their interface, such as an increase or decrease in a wager being a function of the player's decision making as to their operational profile in the entertainment game (i.e. power of the character, gun selection, car choice, etc.). In this manner, the player is always in control of the per game wager amount, with the choice mapping to some parameter or component which is applicable to the entertainment game experience of the bonus jackpot hybrid game. In a particular embodiment, the RWE operation can be a game of chance running every 10 seconds where the amount wagered is communicated from the GWE 110 as a function of choices the player makes in the operation profile in the entertainment game such as those cited above.

In many embodiments, a bonus jackpot hybrid game integrates a video game style gambling machine, where the gambling game (i.e. RWE 108 and RC) is not player skill based, while at the same time allows players to use their skills to earn club points which a casino operator can translate to rewards, tournaments opportunities and prizes for the players. The actual exchange of monetary funds earned or lost directly from gambling against a game of chance, such as a slot machine, is preserved. At the same time, a rich environment of rewards to stimulate "garners" can be established with the entertainment game. In several embodiments, the bonus jackpot hybrid game can leverage very popular titles with "garners" and provides a sea change environment for casinos to attract players with games that are more akin to the type of entertainment, which a younger generation desires. In various embodiments, players can use their skill towards building and banking GWC, which in turn can be used to win tournaments and various prizes as a function of their "garners" prowess. Numerous embodiments minimize the underlying changes needed to the aforementioned entertainment software (Gears of War, etc.), for the bonus jackpot hybrid game to operate within an entertainment game construct, thus making a plethora of complex game titles and environments, rapid and inexpensive to deploy in a gaming environment.

In various embodiments, a system is provided that effects the integration of modules or elements allowing players to utilize a new type of slot machine game that operates on and/or accrues or consumes new forms of currency, one such currency being legal tender or script as real world credit (RC), another currency being game world credit (GWC), as the system integrates a traditional game of random chance playing for RC that functions in concert with a skill game playing for GWC.

In various embodiments, a bonus jackpot hybrid game can be played by users on a wide areas network, such as the Internet, through a website (e.g. Facebook®, addictinggames.com, bodog.com, etc.) or a dedicated application running on a computer such as an iPad, mobile phone, laptop, PlayStation®, or other computer device. In some embodiments, a flexible gaming environment organizes the various modules or elements into a system that can enable game play with a gambling component, allowing various combinations of the modules or elements (from one or more distinct entities) to be organized to achieve a specific player experience, while providing for regulation, oversight and auditing of a gaming businesses.

In some embodiments, to bring into effect an instance of a bonus jackpot hybrid game on-line, a number of modules or elements are present. These include an entertainment software engine (ESE), that provides rich multi-media output of high entertainment value to the player, a game world engine (GWE), and a real world engine or (RWE).

In various embodiments, all of these modules or elements of a bonus jackpot hybrid game can be present in a single physical game located on the floor of a casino. In other embodiments, each of these modules or elements (or a subset of them) can be distributed across servers that are not physically coincident. In some of these embodiments, these modules or elements can be dynamically organized, or put another way, mixed, to alter the implementation of the bonus jackpot hybrid game in response to the desires of the player or the company or companies that control various embodiments of the value chain related to providing end users with a complete gaming experience while providing that regulatory and auditing requirements are met.

In some embodiments, the ESE, GWE and RWE can be resident on one or more computers and tied together inextricably (i.e. the software in each instance of the aforementioned modules or elements is programmed to connect to a specifically named module or element of each other) to provide the functionality necessary to implement the bonus jackpot hybrid game. In this embodiment, regulating and auditing of the system is achieved through the functionality of the various modules or elements making up the bonus jackpot hybrid game, and it is likely, though not necessary, that each of these functional modules or elements are under the control of a single entity that is effectively delivering the entire game experience to the end user. A real world (RW) and game world (GW) user interfaces could, for example, share a single window in a web-browser, or operate through separate windows in a web browser. In some embodiments, a game world includes an entertainment portion of a bonus jackpot hybrid game and is made up of information typically associated with a virtual entertainment environment, including the bonus jackpot hybrid game's visual and logical game space, game state, game characters, progress points and scores. For the purposes of this disclosure, typical games played on a gaming console, such as a Sony PlayStation®, or a PC could be thought of as in the GW.

They could also take the form of more freestanding web-enabled apps resident on a mobile device or other computer.

In other embodiments, the various functional modules or elements are not tied together inextricably but rather can be organized dynamically in response to commands from a control layer, thereby allowing a specific combination of ESE, GWE, RWE (and also potentially a game world credit exchange (GWCE)) to be organized dynamically in response to input provided from one or more parties (e.g. the player, the operator of the site through that the player interfaces to the game, a provider of gambling services, regulatory bodies, etc.). In some embodiments, this dynamic organization can be undertaken as often as every game session that is commenced by a player, or much less frequently (i.e. a web site operator, provider of gambling services, regulatory body, and/or other parties may establish a more "permanent" arrangement that persists across a fixed period of time).

Various hybrid games are discussed in Patent Cooperation Treaty Application No. PCT/US11/26768, filed Mar. 1, 2011, entitled "ENRICHED GAME PLAY ENVIRONMENT (SINGLE and/or MULTI-PLAYER) FOR CASINO APPLICATIONS" and Patent Cooperation Treaty Application No. PCT/US11/63587, filed Dec. 6, 2011, entitled "ENHANCED SLOT-MACHINE FOR CASINO APPLICATIONS" each disclosure of which is hereby incorporated by reference in its entirety. The RWE, GWE and ESE are also discussed further below.

Figure 2:
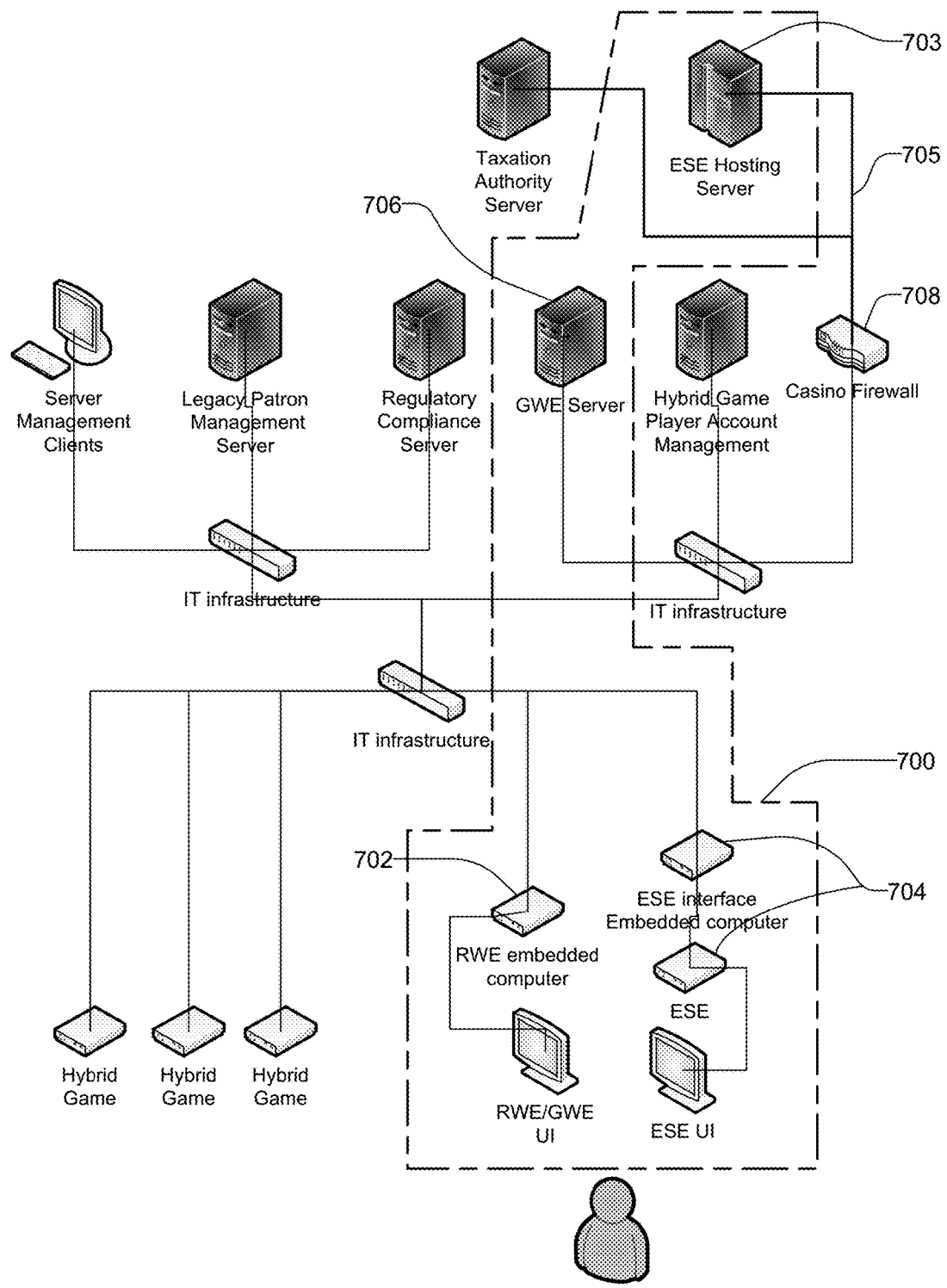
FIG. 2 is a diagram showing an implementation of a bonus jackpot hybrid game in a casino in accordance with an embodiment.

FIG. 2 is a diagram showing an implementation of a bonus jackpot hybrid game in a casino in accordance with an embodiment. In the figure, the bonus jackpot hybrid game 700 components, RWE 702, ESE 704 and GWE 706 are bordered by the dashed line. Also pictured in the diagram are a number of other peripheral systems, such as player management, casino management, regulatory, and hosting servers that may be present in such an implementation. FIG. 2 also illustrates various other systems, which may reside outside the bounds of the casino and are connected to the framework via communications network, such as the Internet 705, depicted by the connection lines past the casino firewall 708. It should be understood that FIG. 2 does not attempt to illustrate all servers and systems to which a bonus jackpot hybrid game 700 might be inevitably be connected, and indeed one might expect there would be others, but rather provides an example of a set of a sub-set of systems which would be present in an installation.

Figure 3:
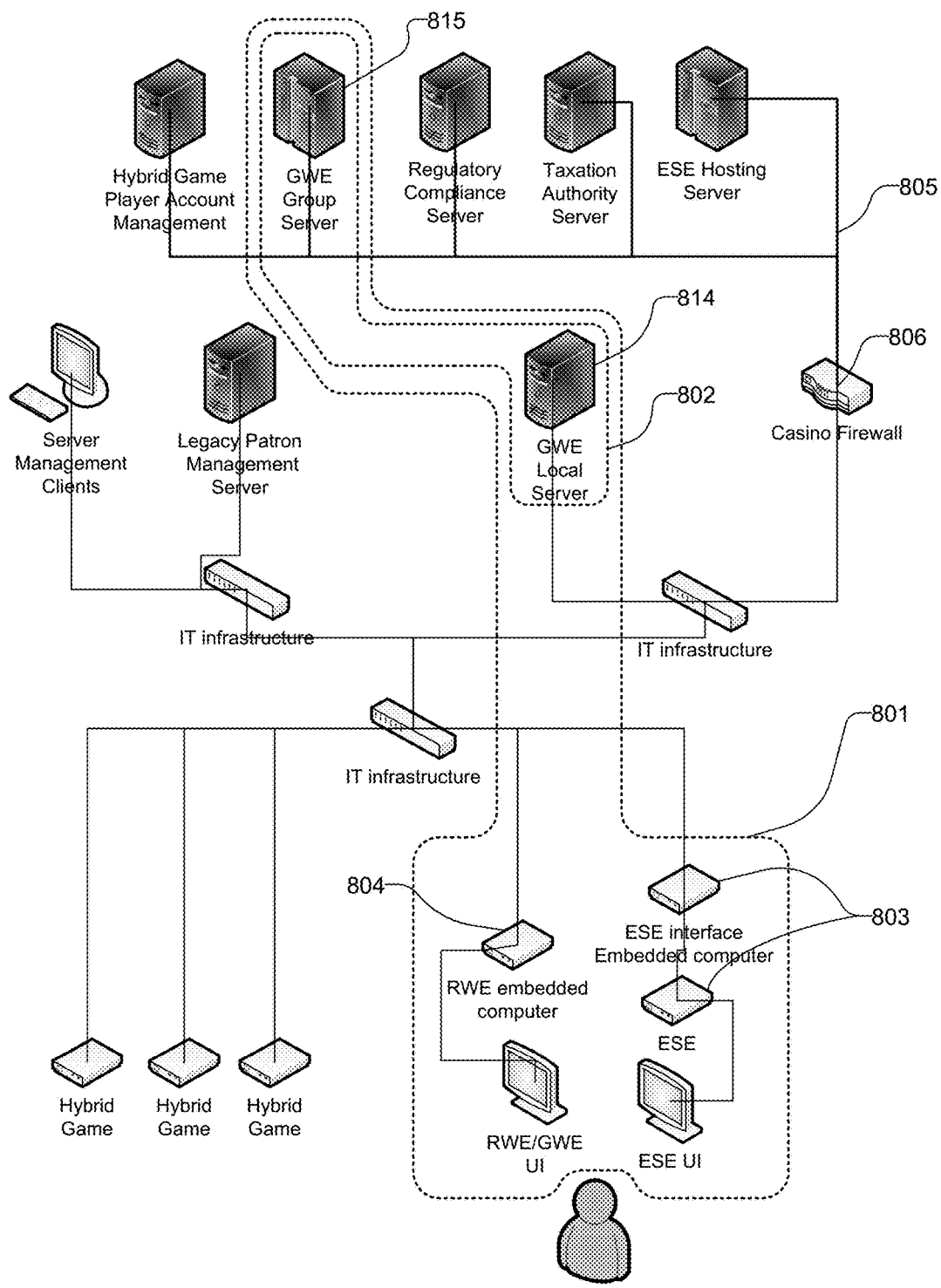
FIG. 3 is a diagram showing another implementation of a bonus jackpot hybrid game in accordance with an embodiment.

FIG. 3 is a diagram showing another implementation of a bonus jackpot hybrid game in accordance with an embodiment. Pictured are various components that under one implementation are the GWE 802, the ESE 803 and the RWE 804. In the figure, note that the GWE is comprised of two sub-components, a local GWE server 814, and a cloud server 815. (components within the dash line area 801). In the figure, certain of the components are located within the bounds of the casino, namely the RWE 804, the ESE 803 and a portion of the GWE 802, namely the local GWE server 814. The Cloud Server GWE 815 is located in the cloud connected to the casino bounded hybrid game components via communications network such as the Internet 805.

Figure 4:
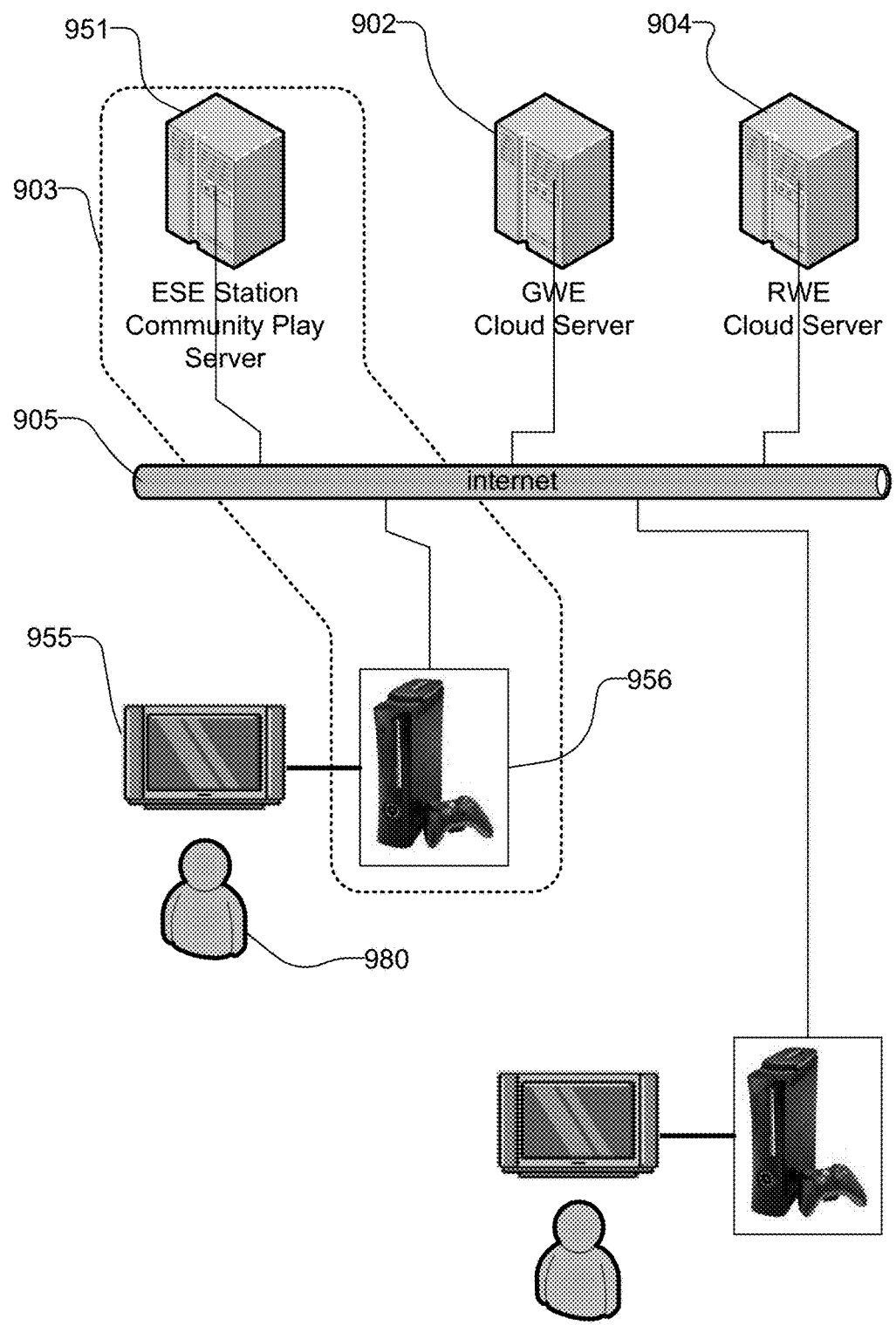
FIG. 4 is a diagram of another implementation of a bonus jackpot hybrid game in accordance with an embodiment.

FIG. 4 is a diagram of another implementation of a bonus jackpot hybrid game in accordance with an embodiment. In the diagram, a bonus jackpot hybrid game 901 is composed of various components connected together by a communications network, such as the Internet 905. In this particular aspect, the ESE 903 is made up of sub components consisting of a typical home video game console 956 (or other types of home gaming computer) coupled to an ESE hosting server 951 which in this example provides for community and head to head play among multiple players on connected consoles 956, reflected in the diagram by the pictured second player and video game console. Also shown, is a UI 955 coupled to the video game console 956 to provide for a player 980 interface. The other core modules or elements of a bonus jackpot hybrid game are also pictured, namely the GWE 902 in the form of a cloud server, and the RWE 904 in the form of a cloud server. It should be noted that the FIG. 4 implementation is the bonus jackpot hybrid game architecture accomplished primarily in the cloud, functionally equivalent to the land based and semi-land based solutions shown in FIGS. 2 and 3.

There are many possible permutations of how a bonus jackpot hybrid game could be constructed, with FIGS. 2, 3 and 4 showing only three possible permutations and provided as examples, which are not intended to suggest limitations to the forms of the architecture. Other embodiments include a version where the entire hybrid game is in the cloud with only a client running on player terminal within the bounds of the casino, or a version where the RWE and GWE are casino bound and the ESE exists in the cloud, accessed by a client running on a terminal in the casino.

Figure 5:
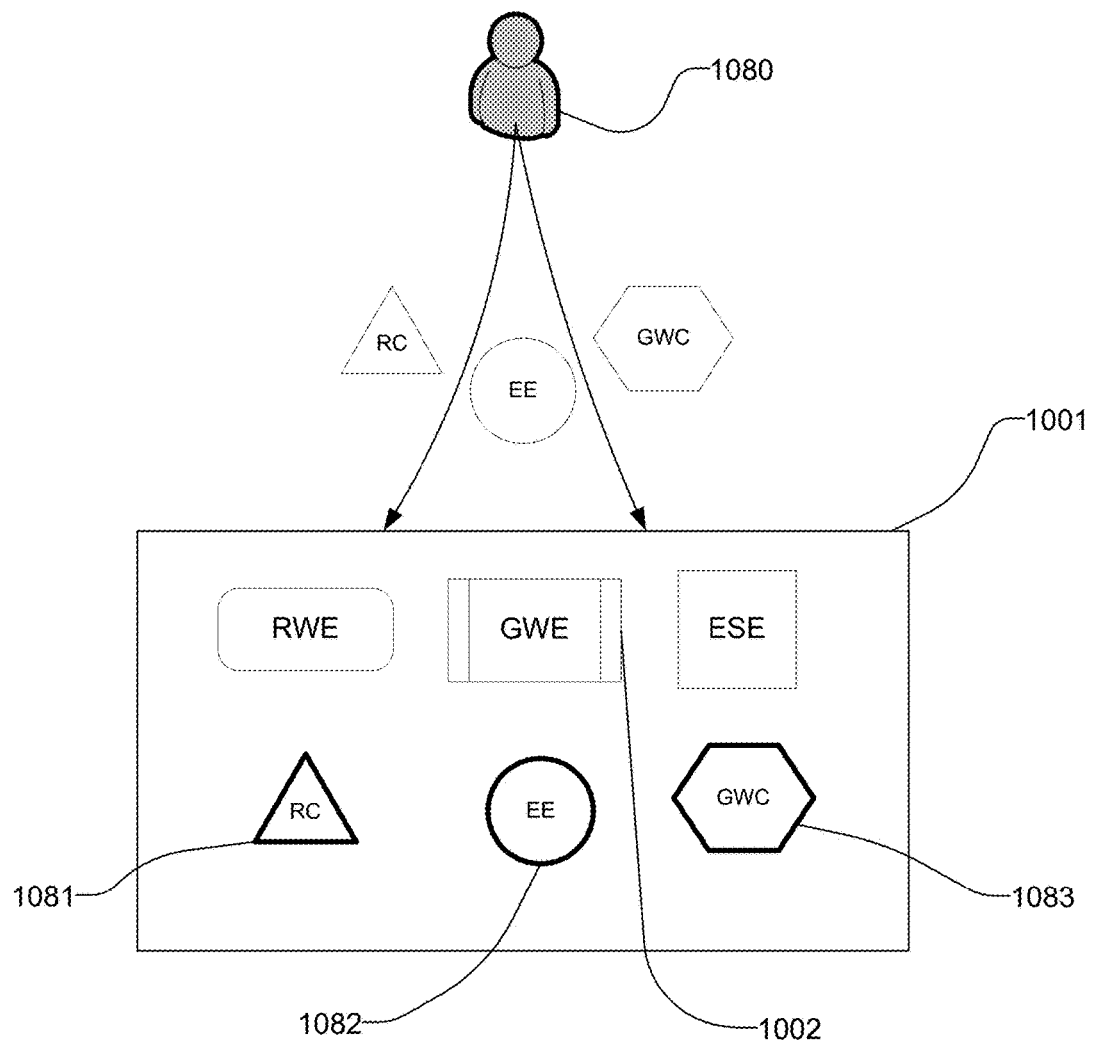
FIG. 5 illustrates an overview of a credit system of a bonus jackpot hybrid game in accordance with an embodiment.

FIG. 5 illustrates an overview of a credit system of a bonus jackpot hybrid game in accordance with an embodiment. In the figure, the player 1080 commences interaction with the game by contributing one or more of three types of credits to the game, the three being: (i) RC 1081 which is a currency fungible instrument, (ii) GWC 1083 which are game world credits, and (iii) EE 1082 which is the enabling module or element of the entertainment portion of the game running on the ESE. An enabling module or element is a module or element of the entertainment game that is consumed by, traded or exchanged in, operated upon, or used to enable the entertainment game portion of the bonus jackpot hybrid game. There may be one or more types of EE present in a bonus jackpot hybrid game's entertainment game. Examples of EE include bullets in a shooting game, fuel in a racing game, letters in a word spelling game, downs in a football game, portions in a character adventure game, character health points, etc.

The contribution of one or more of these modules or elements may be executed by insertion into the game of currency in the case of RC, and/or transferred in as electronic credit in the case of any of the RC, GWC and EE. Electronic transfer in of these credits may come via a smart card, voucher or other portable media, or as transferred in over a network from a patron server or hybrid game player account server. In certain implementations, these credits may not be transferred into the bonus jackpot hybrid game, but rather drawn on demand from player accounts located in servers residing on the network or in the cloud on a real time basis as the credits are consumed by the bonus jackpot hybrid game. Once these credits are deposited, or a link to their availability is made, the bonus jackpot hybrid game has them at its disposal to use for execution of the game. Generally, the RC is utilized by and accounted for by the RWE 1004, and the EE 1082 and GWC 1083 are utilized and accounted for by the GWE and/or the ESE.

Figure 6:
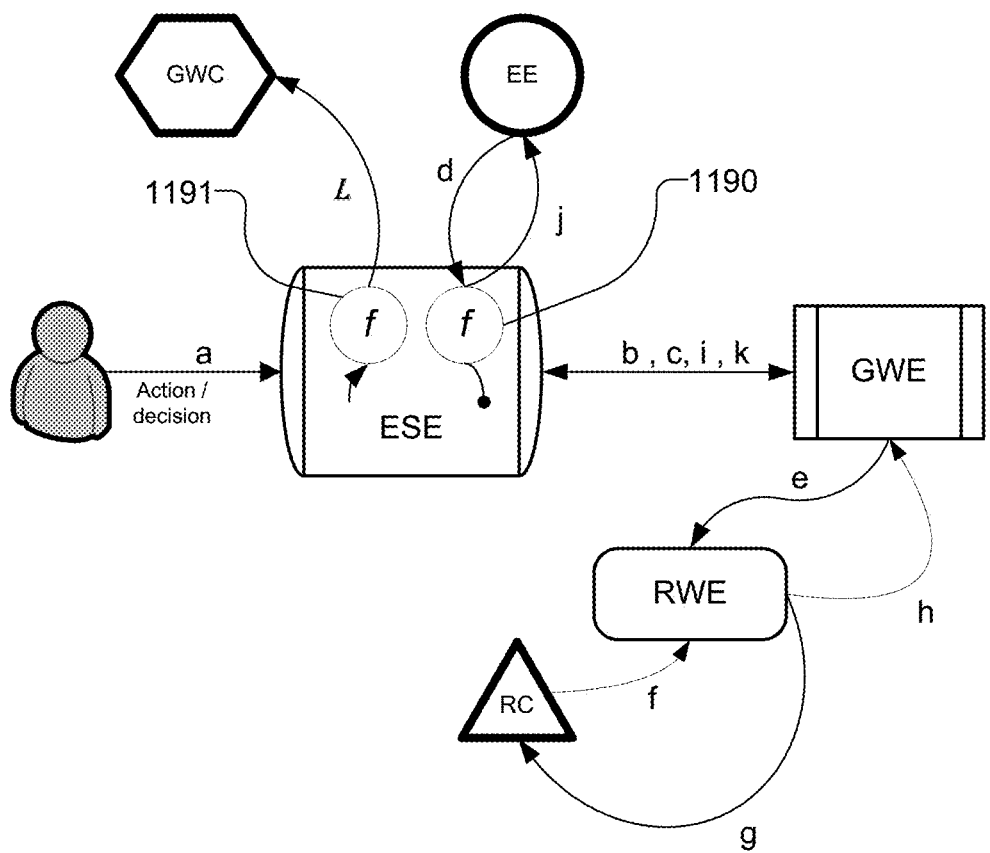
FIG. 6 shows a credit flow and management in a bonus jackpot hybrid game in accordance with an embodiment.

FIG. 6 shows a credit flow and management in a bonus jackpot hybrid game in accordance with an embodiment. Pictured in the figure are hybrid game modules or elements RWE, GWE and ESE, and the three types of credits, RC, EE and GWC as previously described. In FIG. 11, the following steps occur in credit flow and management:

TABLE 1

Hybrid Game Credit Flow and Management

| | |
|---|---|
| a | the player performs an action or makes a decision through the game UI |
| b | the ESE signals the GWE of the player decision or action taken |
| c | the GWE signals the ESE as to the amount of EE that will be consumed by the player action or decision. This signaling configures function 990 to control the EE consumption, decay or addition |
| d | the ESE consumes the amount of EE designated by the GWE to couple to the player action |
| e | the GWE signals the RWE as to the profile of the wager proposition associated with the particular action, and triggers the wager |
| f | the RWE consumes RC for the wager and executes the wager |
| g | the RWE returns RC depending on the outcome of the wager |
| h | the RWE informs the GWE as to the outcome of the wager |
| i | The GWE signals the ESE to add additional (or subtract, or add 0) EE to one or more of the EEs of the ESE entertainment game. This is reflected as function 990 in the figure. |
| j | The ESE reconciles the EE(s) of the entertainment game. |
| k | The ESE signals the GWE as to its updated status, and the GWE signals the ESE to add additional (or subtract, or add 0) GWC to one or more of the GWC of the ESE entertainment game. This is reflected in function 991 in the figure. |
| L | The ESE reconciles the GWC(s) of the entertainment game. |

The credit flow according to the method described above, can be illustrated by the following example in a first person shooter game, such as Call of Duty® again using the same hybrid game sequence:

TABLE 2

Example Hybrid Game Credit Flow and Management

| | |
|---|---|
| a | the player selects a machine gun to use in the game. The player fires a burst at an opponent. {the player performs an action or makes a decision through the game UI} |
| b | the ESE signals the GWE of the player's choice of weapon, that a burst of fire was fired, and the outcome of whether the player hit the opponent with the burst of fire. {the ESE signals the GWE of the player decision or action taken} |
| c | the GWE processes the information in b above, and signals the ESE to consume 3 bullets (EE) with each pull of the trigger. {the GWE signals the ESE as to the amount of EE that will be consumed by the player action or decision. This signaling configures function 990 to control the EE consumption, decay or addition} |
| d | the ESE entertainment game consumes 3 bullets (EE) since the trigger was pulled. {the ESE consumes the amount of EE designated by the GWE to couple to the player action} |
| e | the GWE signals the RWE that 3 credits (RC) are to be wagered to match the 3 bullets (EE) consumed, on a particular pay table (table Ln-RC) as a function how much damage the player inflicted on his/her opponent. {the GWE signals the RWE as to the profile of the wager proposition associated with the particular action, and triggers the wager} |
| f | the RWE consumes the 3 credits for the wager and executes the specified wager {the RWE consumes RC for the wager and executes the wager} |
| g | the RWE determines that the player hits a jackpot of 6 credits, and returns these 6 credits (RC) to the credit meter. {the RWE returns RC depending on the outcome of the wager} |
| h | the RWE informs the GWE that 3 credits (RC) net, were won {the RWE informs the GWE as to the outcome of the wager} |
| i | the GWE signals the ESE to add 3 bullets (EE) to the player's ammo clip {The GWE signals the ESE to add additional (or subtract, or add 0) EE to one or more of the EEs of the ESE entertainment game. This is reflected as function 1190 in the figure} |
| j | the ESE adds back 3 bullets (EE) to the player's ammo clip in the entertainment game. This may take place by directly adding them to the clip, or may happen in the context of the entertainment game, such as the player finding extra ammo on the ground or in an old abandoned ammo dump. {The ESE reconciles the EE(s) of the entertainment game} |
| k | The GWE logs the new player score (GWC) in the game (as a function of the successful hit on the opponent) based on ESE signaling, and signals the ESE to add 2 extra points to their score since a jackpot was won. {The ESE signals the GWE as to its updated status, and the GWE signals the ESE to add additional (or subtract, or add 0) GWC to one or more of the GWC of the ESE entertainment game. This is reflected in function 1191 in the figure} |
| L | the ESE adds 10 points to the player's score (GWC) given the success of the hit which in this example is worth 8 points, plus the 2 extra points requested by GWE. {The ESE reconciles the GWC(s) of the entertainment game.} |

Note that the foregoing example in Table 2 is intended to provide an illustration of how credits flow in a bonus jackpot hybrid game, but is not intended to be exhaustive and only lists only one of numerous possibilities of how a bonus jackpot hybrid game may be configured to manage its fundamental credits.

Although various components of bonus jackpot hybrid games are discussed above, bonus jackpot hybrid games can be configured with any component appropriate to the requirements of a specific application in accordance with various embodiments.

Bonus Jackpots in a Bonus Jackpot Hybrid Game

Figure 7:
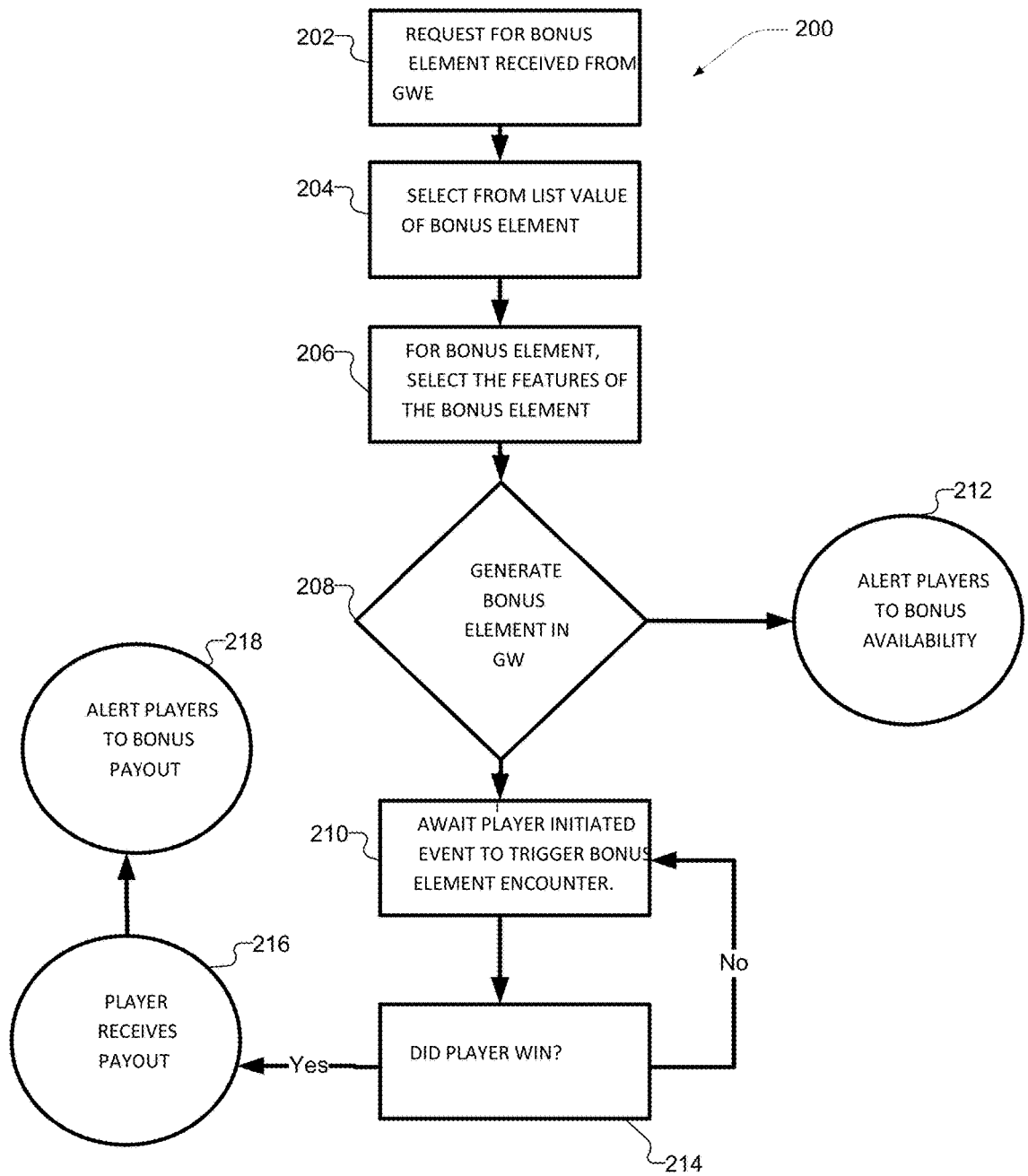
FIG. 7 is a process flow diagram of a bonus jackpot process in accordance with an embodiment.
Figure 8:
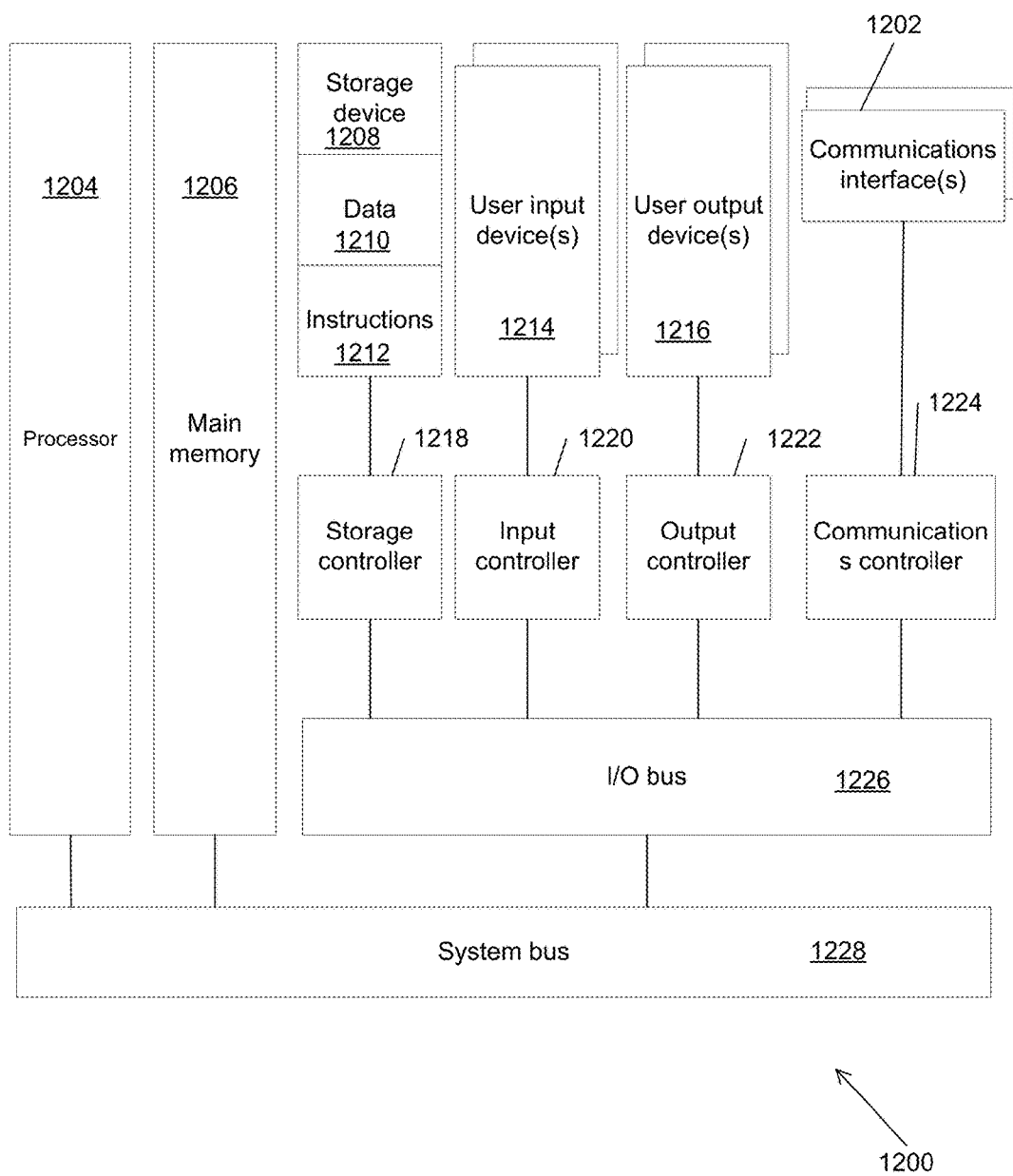
FIG. 8 illustrates a processing apparatus in accordance an embodiment.

FIG. 7 is a process flow diagram of a bonus jackpot process in accordance with an embodiment. In the process 200, an operator requests (202) a bonus element to be inserted into a bonus jackpot hybrid game. The operator then selects (204) a type of bonus element to provide in the hybrid game. The operator selects (206) the features of the bonus element. Once the bonus element is configured by the operator, the bonus element is generated (208) within the game world. All of the players are alerted (212) to the presences of the bonus element in the game world. While the player's play the hybrid game looking for the bonus elements, the process awaits (210) a player initiated event to trigger a bonus element encounter. If it is determined (214) that the player did not win the bonus, the process continues to wait (210) for a player initiated trigger event. If the player did win, the player receives (216) a payout. In addition, the players are alerted (218) to the fact that the bonus was paid out.

In some embodiments, an operator may insert additional bonus elements into the entertainment portion of a bonus jackpot hybrid game. For example, in a multi-player shooting game, the operator may want to include a non-player character (NPC) to be found and that is worth additional points, credits, improves RW waging odds, and/or other bonuses.

In many embodiments, measures are provided in the bonus jackpot hybrid game for an operator to include a bonus element in the context of the bonus jackpot hybrid game where the outcome of the game is in part or in whole determined by player skill and where betting as a function of skill-related performance and/or outcomes is permitted. Each of these embodiments can be used singularly or in conjunction with one or more of the other embodiments.

In numerous embodiments, an operator may want to increase interest and excitement by inserting a bonus element into the entertainment portion of a bonus jackpot hybrid game. This bonus element may consist of an inbuilt part of the bonus jackpot hybrid game, or an entirely new feature.

In one embodiment, multiple players may occupy the same GW space. For example, in a shooting game, multiple players may roam the same space, encountering each other or other GW obstacles. The operator may use this joint space to introduce a unique element. The competitors in the shared space may compete to locate, defeat, destroy or otherwise surmount this element and claim a bonus.

In some embodiments, the bonus element may consist of a "roaming target". This target may move independently of the players and use the entire space. It may follow a set path, or a path calculated through an RNG system. For instance, in a western-style shooting game, a desperado may travel from town to town along a set road. Alternatively, the desperado may move from place to place without following the paths a player might use. The player may encounter the desperado along the road, in town or at any other location along the path.

In numerous embodiments, the bonus element does not move from place to place, but generates at a location and stays in the same place until it is claimed by a player. For instance, in the western shooting game, the desperado may be found in a saloon, and stays at the bar until he is defeated. After his defeat, he may reappear immediately, after a set amount of virtual or real time, after a certain number of bets are placed, after a certain number of players enter the GW, or any of a number of measurements. The GW may have any number of locations where the desperado appears.

In some embodiments, the bonus element does not travel in the game from place to place, but remains in a set location for a period of either real or virtual time. The bonus element may periodically appear at different locations and at different times. For example, the desperado may appear in a town for ten minutes and then disappear for an hour before reappearing in the same town or another location. The time between appearances and dissipation may be set or random. For example, during the first appearance the desperado stays for five minutes in Town A, disappears for 2 hours, and then appears in Town B for an hour, etc.

Bonus Awards

Destroying, discovering, or otherwise completing rare achievements such as the bonus elements is itself an attraction for many gamers. However, in many embodiments, the bonus elements introduced by an operator may have other awards associated with them as well. These awards may include RC, GWC, promotional items, EE, AE or other currency.

In numerous embodiments, the bonus element pays out a flat award. No matter how often it is generated or destroyed, any player winning the bonus receives the same amount. For example, defeating the desperado always pays out the same "bounty."

In some embodiments, the value of the bonus increases in relation to real or virtual time. For instance, in the Western-style game, the desperado is more valuable as time goes on: he does more damage over more time, so his bounty increases.

In many embodiments, the value of a bonus decreases in relation to real or virtual time. For example, in a fighting game, the bonus element may be a bomb detonator. As time goes on and different bombs are triggered, the value of locating the detonator decreases.

In numerous embodiments, the value of the bonus increases in relation to an operator selected factor which may include, but is not limited to, number of players in the bonus jackpot hybrid game, amount of money wagered, number of wagers, etc. For example, as more players enter the game, the potential payout from the bonus may increase, thus encouraging more players to enter competition.

Claiming the Bonus

In many embodiments, the target may be the objective for destruction, discovery, or other achievement necessary to claim the bonus. In a particular embodiment, locating the bonus feature may be sufficient for a player to claim it. For instance, a player may need to simply find a chest that generates when the bonus is available. However, there may be a second component before a player wins the bonus. For example, the player must find the chest, and also successfully open the chest in order to win.

In numerous embodiments, the player has improved odds for winning the jackpot once the bonus is available. For example, in a Western-style shooting game, a player has a 50/50 chance of successfully killing the desperado once the enemy has been found.

In some embodiments, defeating or otherwise claiming the bonus becomes more difficult as its value increases. For instance, the desperado may be easily defeated when the prize is low, but when the prize is greater, he becomes far more challenging. This relationship could be linear, exponential, level-based, or based on a variety of algorithms applied by the operator.

Processing Apparatus

Any of a variety of processing apparatuses can host various components of a regulated hybrid gaming system in accordance with embodiments of the invention. In several embodiments, these processing apparatuses can include, but are not limited to, a gaming machine, a general purpose computer, a mobile device, a computing device and/or a controller. A processing apparatus in accordance with various embodiments of the invention is illustrated in FIG. 12. In the processing apparatus 1200, a processor 1204 is coupled to a memory 1206 by a bus 1228. The processor 1204 is also coupled to non-transitory processor-readable storage media, such as a storage device 1208 that stores processor-executable instructions 1212 and data 1210 through the system bus 1228 to an I/O bus 1226 through a storage controller 1218. The processor 1204 is also coupled to one or more interfaces that may be used to connect the processor to other processing apparatuses as well as networks as described herein. The processor 1204 is also coupled via the bus to user input devices 1214, such as tactile devices like keyboards, keypads, foot pads, touch screens, trackballs, etc., as well as non-contact devices such as audio input devices, motion sensors and motion capture devices, etc. that the processing apparatus may use to receive inputs from a user when the user interacts with the processing apparatus. The processor 1204 is connected to these user input devices 1214 through the system bus 1228, to the I/O bus 1226 and through the input controller 1220. The processor 1204 is also coupled via the bus to user output devices 1216 such as (but not limited to) visual output devices, audio output devices, and/or tactile output devices that the processing apparatus uses to generate outputs perceivable by the user when the user interacts with the processing apparatus. In several embodiments, the processor is coupled to visual output devices such as (but not limited to) display screens, light panels, and/or lighted displays. In a number of embodiments, the processor is coupled to audio output devices such as (but not limited to) speakers, and/or sound amplifiers. In many embodiments, the processor is coupled to tactile output devices like vibrators, and/or manipulators. The processor is connected to output devices from the system bus 1228 to the I/O bus 1226 and through the output controller 1222. The processor 1204 can also be connected to a communications interface 1202 from the system bus 1228 to the I/O bus 1226 through a communications controller 1224.

In various embodiments, a processor loads the instructions and the data from the storage device into the memory and executes the instructions and operates on the data to implement the various aspects and features of the components of a gaming environment as described herein. The processor uses the user input devices and the user output devices in accordance with the instructions and the data in order to create and operate user interfaces for players, casino operators, owners, etc. as described herein.

Although the processing apparatus is described herein as being constructed from a processor and instructions stored and executed by hardware components, the processing apparatus can be composed of only hardware components in accordance with many embodiments. In addition, although the storage device is described as being coupled to the processor through a bus, those skilled in the art of processing apparatuses will understand that the storage device can include removable media such as a USB memory device, an optical CD ROM, magnetic media such as tape or disks, etc. Also, the storage device can be accessed through one of the interfaces or over a network. Furthermore, any of the user input devices or user output devices can be coupled to the processor via one of the interfaces or over a network. In addition, although a single processor is described, those skilled in the art will understand that the processor can be a controller or other computing device or a separate computer as well as be composed of multiple processors or computing devices.

In numerous embodiments, any of a gaming environment, an RWE, a GWE or an ESE as described herein can be implemented on one or more processing apparatuses, whether dedicated, shared or distributed in any combination thereof, or may be implemented on a single processing apparatus. In addition, while certain aspects and features of a gaming system described herein have been attributed to an RWE, a GWE or an ESE, these aspects and features may be implemented in a hybrid form where any of the features or aspects may be performed by any of an RWE, a GWE or an ESE within a gaming environment without deviating from the spirit of the embodiments disclosed herein.

While the above description contains many specific embodiments of the invention, these should not be construed as limitations on the scope of the invention, but rather as an example of one embodiment thereof. It is therefore to be understood that the invention can be practiced otherwise than as specifically described, without departing from the scope and spirit of the invention. Thus, embodiments of the invention should be considered in all respects as illustrative and not restrictive.

What is claimed is:

1. An electronic gaming machine constructed to receive real world credit from a player, comprising:
   a game world engine coupled to a real world engine, wherein the real world engine is constructed to provide a gambling game, the gambling game having a randomly generated payout of real world credits using a random number generator;
   the game world engine coupled via a network to a skill-based entertainment game, the skill-based entertainment game having outcomes based upon the player's execution of the skill-based entertainment game to earn a payout of game world credits;
   wherein the game world engine is constructed to:
      receive via the network from the real world engine a configuration for a jackpot bonus element based on an operator request;
   generate a perceivable display of the jackpot bonus element in the skill-based entertainment game using a visual output device;
   provide a payout of real world credit in the gambling game when a player initiates an encounter in the skill-based entertainment game with the jackpot bonus element; and
   provide a payout of game world credit in the skill-based entertainment game in the case the player achieves an objective in the skill-based entertainment game associated with the jackpot bonus element.

2. The electronic gaming machine of claim 1, wherein the jackpot bonus element is a non-player character in the skill-based entertainment game portion of the hybrid game.

3. The electronic gaming machine of claim 1, wherein the skill-based entertainment game portion of the hybrid game is played by multiple players and the multiple players compete to trigger the payout of real world credits in the gambling game by encountering the jackpot bonus element within the skill-based entertainment game.

4. The electronic gaming machine of claim 1, wherein the real world credit is a currency fungible instrument.

5. The electronic gaming machine of claim 1, wherein the jackpot bonus element appears periodically within the skill-based entertainment game.

6. The electronic gaming machine of claim 1, wherein player has improved odds for winning the jackpot bonus once the jackpot bonus is available.

7. The electronic gaming machine of claim 1, wherein finding the jackpot bonus is sufficient for claiming the jackpot bonus.

8. The electronic gaming machine of claim 1, wherein the difficulty of defeating or otherwise claiming the jackpot bonus in the skill-based entertainment game is modified by the value of the jackpot bonus.

9. The electronic gaming machine of claim 1, wherein defeating or otherwise claiming the jackpot bonus becomes more difficult based on the payout of game world credits earned in the skill-based entertainment game player is playing.

10. The electronic gaming machine of claim 1, wherein an amount of the gambling game is based on a choice made by the player in playing the skill-based entertainment game.

11. The electronic gaming machine of claim 1, wherein the odds of the gambling game are based on a choice made by the player in playing the skill-based entertainment game.

\* \* \* \* \*